United States Patent
O'Kelley et al.

(10) Patent No.: US 9,606,956 B2
(45) Date of Patent: Mar. 28, 2017

(54) METHOD AND SYSTEM FOR PROVIDING A TABLET SWIPING CALCULATOR FUNCTION

(71) Applicant: Intuit Inc., Mountain View, CA (US)

(72) Inventors: Katy Lee O'Kelley, Cumming, GA (US); Jason Wayne Cole, Athens, GA (US); Matthew Patrick Bozeman, Athens, GA (US); Lauren Ashly Felten, Athens, GA (US)

(73) Assignee: Intuit Inc., Mountain View, CA (US)

( * ) Notice: Subject to any disclaimer, the term of this patent is extended or adjusted under 35 U.S.C. 154(b) by 731 days.

(21) Appl. No.: 14/010,011

(22) Filed: Aug. 26, 2013

(65) Prior Publication Data
US 2015/0058387 A1     Feb. 26, 2015

(51) Int. Cl.
*G06F 15/00* (2006.01)
*G06F 15/02* (2006.01)
*G06F 3/0488* (2013.01)

(52) U.S. Cl.
CPC ............ *G06F 15/00* (2013.01); *G06F 3/0488* (2013.01); *G06F 15/025* (2013.01); *G06F 15/0225* (2013.01)

(58) Field of Classification Search
None
See application file for complete search history.

(56) References Cited

U.S. PATENT DOCUMENTS

| | | | | |
|---|---|---|---|---|
| 5,428,805 | A * | 6/1995 | Morgan | G06F 3/04883 345/173 |
| 8,095,436 | B1 * | 1/2012 | Shah | G06Q 40/02 705/30 |
| 2003/0004853 | A1 | 1/2003 | Ram et al. | |
| 2011/0307535 | A1 * | 12/2011 | Vukosavljevic | G06F 3/04883 708/142 |
| 2014/0129986 | A1 * | 5/2014 | Hautala | G06F 15/0225 715/830 |

FOREIGN PATENT DOCUMENTS

CN    WO 2010102639 A1 * 9/2010 .......... G06F 3/0481

OTHER PUBLICATIONS

Machiavelli, "Gesture Calculator Guide", YouTube video uploaded Dec. 5, 2010, retrieved from https://www.youtube.com/watch?v=EnoAFrPn0w4.*

(Continued)

*Primary Examiner* — Matthew Sandifer
(74) *Attorney, Agent, or Firm* — Hawley Troxell Ennis & Hawley LLP; Philip McKay

(57) ABSTRACT

A listing of data is displayed in a tablet swiping calculator function display with the listing of data including two or more numerical data entries. A capability to select at least one mathematical operation is provided through the tablet swiping calculator function display along with the capability to select at least two of the two or more numerical data entries through the tablet swiping calculator function display. When the at least two of the two or more numerical data entries are selected, the selected mathematical operation is automatically performed on the selected numerical data entries and the results are displayed on the tablet swiping calculator function display.

34 Claims, 6 Drawing Sheets

(56) References Cited

OTHER PUBLICATIONS

Kazmucha, "Best iPhone Calculator App for Students," [online] published Feb. 20, 2013. Retrieved on Jun. 1, 2014 from the Internet <URL:http://www.imore.com/best-iphone-calculator-app-students>, 4 pages.

Machiavelli, "Gesture Calculator," [online] published Jun. 25, 2012. Retrieved on Jun. 1, 2014 from the Internet <URL:https://itunes.apple.com/us/app/gesture-calculator/id408078172?mt=8>, 2 pages.

Tanu, "Simple Budget (Envelope Budget)" [online] published Jul. 12, 2013. Retrieved on Jun. 1, 2014 from the Internet <URL:https://play.google.com/store/apps/details?id=com.simplebudget>, 5 pages.

* cited by examiner

| | | |
|---|---|---|
| 8/2/2013 | Walmart | 415.99 |
| 8/3/2013 | Shell Oil | 75.00 |
| 8/4/2013 | Home Depot | 146.00 |
| 8/6/2013 | Burger King | 18.99 |
| 8/8/2013 | Chevron | 58.01 |
| 8/12/2013 | ACE Hardware | 66.66 |
| 8/20/2013 | Walmart | 66.99 |
| 8/23/2013 | Albertsons | 23.00 |
| 8/24/2013 | Sonic | 13.50 |
| 8/23/2013 | Carl's Junior | 12.00 |
| 8/28/2013 | Walmart | 112.12 |

FIG. 3A

| | | | |
|---|---|---|---|
| 330— 8/2/2013 | Walmart | 415.99 —331 | |
| 8/3/2013 | Shell Oil | 75.00 | |
| 8/4/2013 | Home Depot | 146.00 | |
| 8/6/2013 | Burger King | 18.99 | |
| 8/8/2013 | Chevron | 58.01 | |
| 8/12/2013 | ACE Hardware | 66.66 | |
| 332— 8/20/2013 | Walmart | 66.99 —333 | |
| 8/23/2013 | Albertsons | 23.00 | |
| 8/24/2013 | Sonic | 13.50 | |
| 8/23/2013 | Carl's Junior | 12.00 | |
| 8/28/2013 | Walmart | 112.12 | |

METHOD AND SYSTEM FOR PROVIDING A TABLET SWIPING CALCULATOR FUNCTION

BACKGROUND

Given that mobile computing systems, such as smart phones, have emerged as the preferred platform for information access and computing for an increasingly large percentage of computing system users, there is an increased need to ensure that data entry, and data processing functions, can be performed with minimal manual user input and through small form factor display screens.

For instance, while a "qwerty" keyboard can be made to fit in a space less than 2 inches wide on a smart phone, that fact doesn't make it easy or efficient to use. Consequently, using mobile applications and mobile systems it is currently difficult to record or enter data and perform various basic computing system functions. In particular, it takes significant time to manually enter individual letters, numbers, or other symbols using the typical smart phone data entry systems.

One computing function that currently requires significant manual data entry is the typical calculator function provided through most computing systems and/or mobile devices. For instance, in order to perform the simple addition of three numbers, say 100, 200, and 300, a user must currently individually enter the three digits "1", "0", and "0". Then the user must indicate what operation is desired, typically by selecting a symbol, in this specific illustrative example, the addition symbol (+). Then, in this specific illustrative example, the user must individually enter the three digits "2", "0", and "0". Then the user must request the operation be performed, typically by selecting the "=" symbol. Then the user must individually enter the three digits "3", "0", and "0" and again indicate what operation is desired, or vice versa, depending on the particular system being used. Finally the user must again request the operation be performed, typically by selecting the "=" symbol.

All, or most, of the above steps must currently be performed through manual data entry using currently available calculator functions. As can be seen, this provides multiple opportunities for the introduction of errors, typically through user error such as miss keying data. In addition, even when performed/entered correctly, the above process is still time consuming and highly inefficient. This situation is far from ideal even on a traditional desk-top computing system with a full sized keyboard. However, when the process is attempted using a small form factor keyboard or display screen, such as those associated with a smart phone or other mobile computing systems, the data entry error probability and inefficacies are even more pronounced, and, at times, results in an unworkable situation. Consequently, currently available calculator functions are not efficient or user friendly in either desktop or mobile environments.

What is needed is an improved calculator function that is easy to use in any computing system environment and is efficient and intuitive for the user.

SUMMARY

In accordance with one embodiment, a system and method for providing a tablet swiping calculator function includes providing a listing of data in a tablet swiping calculator function display with the listing of data including two or more numerical data entries. In one embodiment, a capability to select at least one mathematical operation is provided through the tablet swiping calculator function display, along with the capability to select at least two of the two or more numerical data entries through the tablet swiping calculator function display. In one embodiment, when the at least two numerical data entries are selected, the selected mathematical operation is automatically, or semi-automatically, performed on the selected numerical data entries and the results are displayed on the tablet swiping calculator function display.

BRIEF DESCRIPTION OF THE DRAWINGS

FIG. 3A shows a tablet swiping calculator function display in accordance with one embodiment, including a data listing and mathematical operation selection device, as displayed on a display device of a computing system in accordance with one embodiment;

FIG. 3D shows the tablet swiping calculator function display of FIG. 3A including a data listing with two transaction entries and their associated numerical data indicating the amount of each of the transaction entries being selected for addition via a desired payee entry by a user in accordance with one embodiment.

Figure 1:
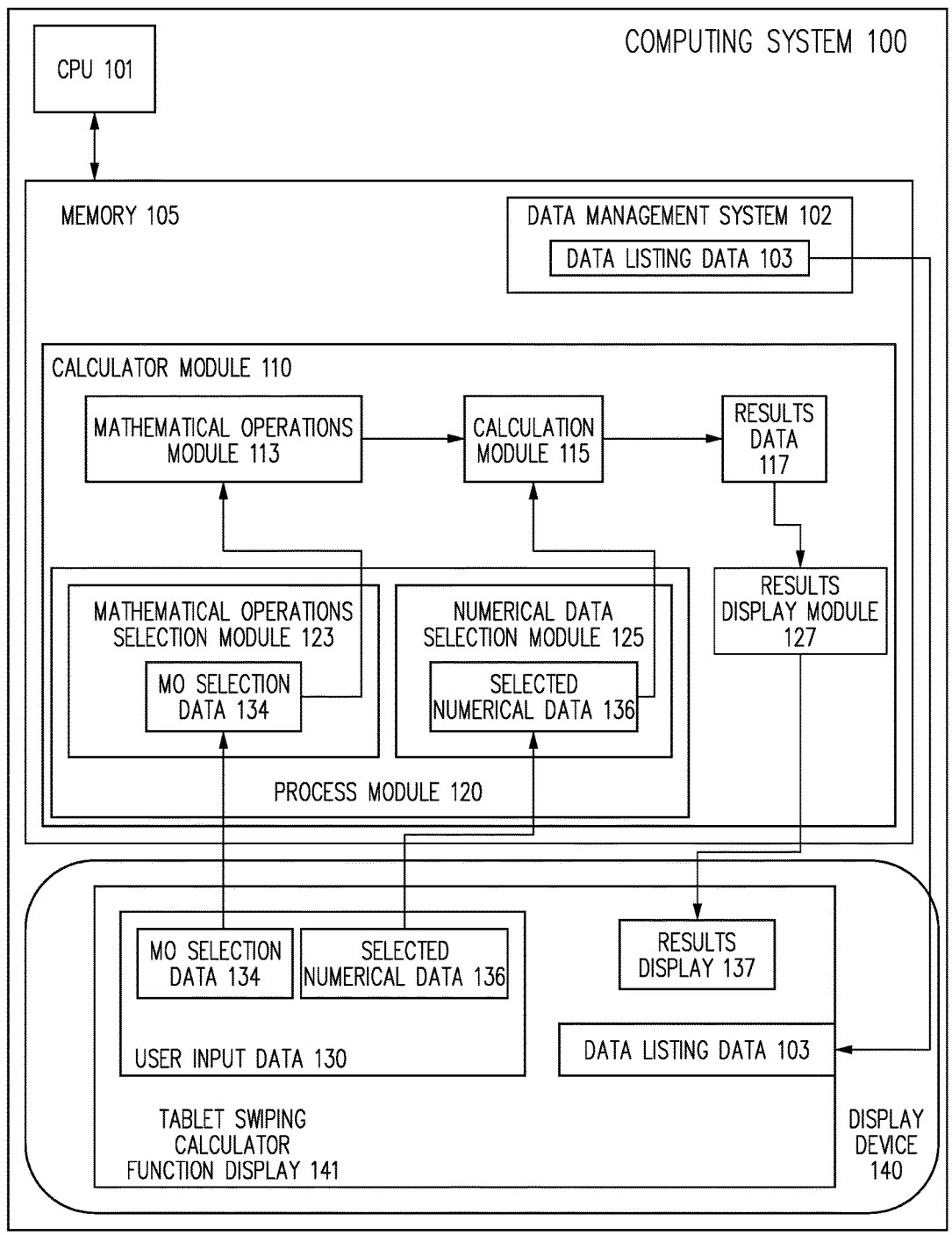
FIG. 1 is a block diagram of an exemplary hardware architecture for implementing one embodiment.

Common reference numerals are used throughout the FIGS. and the detailed description to indicate like elements. One skilled in the art will readily recognize that the above FIGS. are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIGS., which depict one or more exemplary embodiments. Embodiments may be implemented in many different forms and should not be construed as limited to the embodiments set forth herein, shown in the FIGS., and/or described below. Rather, these exemplary embodiments are provided to allow a complete disclosure that conveys the principles of the invention, as set forth in the claims, to those of skill in the art.

In accordance with one embodiment, a system and method for providing a tablet swiping calculator function includes a process for providing a tablet swiping calculator function implemented, at least in part, by one or more processors associated with one or more computing systems.

As used herein, the term "computing system", includes, but is not limited to, a desktop computing system; a portable computing system; a mobile computing system; a laptop computing system; a notebook computing system; a tablet computing system; a workstation; a server computing system; a mobile phone; a smart phone; a wireless telephone; a two-way pager; a Personal Digital Assistant (PDA); a media player, i.e., an MP3 player and/or other music and/or video player; an Internet appliance; or any device that includes components that can execute all, or part, of any one of the processes and/or operations as described herein. In addition, as used herein, the term computing system, can denote, but is not limited to, systems made up of multiple desktop computing systems; portable computing systems; mobile computing systems; laptop computing systems; notebook computing systems; tablet computing systems; workstations; server computing systems; smart phones; wireless telephones; two-way pagers; Personal Digital Assistants (PDAs); media players; Internet appliances; or any devices that can be used to perform the processes and/or operations as described herein.

In one embodiment, one or more computing systems are connected by one or more communications channels, such as, but not limited to, any general network, communications network, or general network/communications network system; a cellular network; a wireless network; a combination of different network types; a public network; a private network; a satellite network; a cable network; or any other network capable of allowing communication between two or more computing systems, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more computing systems, whether available or known at the time of filing or as later developed.

In accordance with one embodiment, data is obtained in the form of a data listing, or listing of data entries. In one embodiment, the data listing includes two or more numerical data entries. In various embodiments, at least part of the data listing is then displayed in a tablet swiping calculator function display on a display device associated with a computing system associated with, or otherwise accessible by, a user.

In one embodiment, the data, and/or data listing data, with two or more numerical data entries, is obtained from one or more data management systems. As used herein, the term "data management system" includes, but is not limited to: computing system implemented, and/or online, business and/or personal financial management systems, packages, programs, modules, or applications; computing system implemented, and/or online, business and/or personal tax preparation systems, packages, programs, modules, or applications; computing system implemented, and/or online, business and/or personal accounting and/or invoicing systems, packages, programs, modules, or applications; computing system implemented, and/or online, banking systems, packages, programs, modules, or applications; and various other electronic data management systems, packages, programs, modules, or applications, whether known at the time of filing or as developed later.

In one embodiment, the data, and/or data listing data, including two or more numerical data entries, is financial data arranged as financial transaction entries, including numerical data representing the amount of the respective financial transaction entries, obtained from one or more financial management systems. Herein, the term "financial management system" includes, but is not limited to, any data management system implemented on a computing system, and/or accessed through a network, that gathers financial data, including financial transactional data, from one or more sources, and/or has the capability to analyze and categorize at least part of the financial data.

Financial management systems include, but are not limited to, computing system implemented, and/or online, personal and/or business financial management systems, packages, programs, modules, or applications; computing system implemented, and/or online, personal and/or business tax preparation systems, packages, programs, modules, or applications; computing system implemented, and/or online, personal and/or business accounting and/or invoicing systems, packages, programs, modules, or applications; and various other personal and/or business data management systems, packages, programs, modules, or applications, whether known at the time of filing or as developed later.

Current financial management systems are typically software applications which, along with a parent computing system or device, help individuals/consumers/businesses manage their finances by providing a centralized interface with banks, credit card companies, asset account providers, mortgage companies, retirement account providers, and other various financial and asset management institutions and/or accounts, for identifying, processing, storing, and categorizing consumer financial transactions and financial data.

In one embodiment, a capability to select at least one mathematical operation is provided through the tablet swiping calculator function display.

In one embodiment, the capability to select at least one mathematical operation is provided through the tablet swiping calculator function display via displayed mathematical operation icons or listings that can be activated through the tablet swiping calculator function display, such as through a touch screen using a finger, or other user interface device.

In other embodiments, the capability to select at least one mathematical operation is provided through the tablet swiping calculator function display via a touch screen and user input in the form of the user drawing, or sketching, a defined mathematical operation symbol on the tablet swiping calculator function display, in one embodiment, using a finger, stylus, or other user interface device. For instance, in one embodiment, the user draws a plus sign/symbol (+), a minus sign/symbol (−), a multiplication sign/symbol (X), or a division sign/symbol (÷) or (/), on the tablet swiping calculator function display using a finger, stylus, or other user interface device.

In one embodiment, once a capability to select at least one mathematical operation is provided, and a mathematical operation is selected through the tablet swiping calculator function display, data indicating the selected mathematical operation is stored in a memory or other database associated with the process for providing a tablet swiping calculator function.

As used herein, the term "database" includes, but is not limited to, any data storage mechanism known at the time of filing, or as developed thereafter, such as, but not limited to, a hard drive or memory; a designated server system or computing system, or a designated portion of one or more server systems or computing systems; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to any data storage means that is part of, or under the control of, any computing system, as discussed herein, known at the time of filing, or as developed thereafter.

As noted above, as mobile computing systems, such as smart phones, have proliferated, there is an increased need to ensure that data entry, and data processing functions, can be performed with minimal manual user input and through small form factor display screens. However, currently, calculator functions that perform a mathematical operation on two or more numerical data entries currently require significant manual data entry.

In contrast to this prior art approach, and to eliminate this significant amount of manual data entry, in one embodiment, once a capability to select at least one mathematical operation is provided, and a mathematical operation is selected through the tablet swiping calculator function display, the capability to select at least two of the two or more numerical data entries of the numerical data entries list through the tablet swiping calculator function display is provided.

In one embodiment, the capability to select at least two of the two or more numerical data entries through the tablet swiping calculator function display is provided by allowing a user to drag and drop the numerical data entries onto each other. In one embodiment, as the user drags and drops the numerical data entries onto each other, a visual indication of the drag and drop operation, and the numerical data entries involved, is displayed on the tablet swiping calculator function display.

In one embodiment, the visual indication of the operation, and the two or more numerical data entries involved, as displayed on the tablet swiping calculator function display includes a ghost image, residual display, or other lingering visual indication, of the operation, and the two or more numerical data entries involved.

In one embodiment, the capability to select at least two of the two or more numerical data entries through the tablet swiping calculator function display is provided by allowing a user to hold and swipe the numerical data entries into each other. In one embodiment, as the user holds and swipes the numerical data entries into each other, a visual indication of the hold and swipe operation, and the numerical data entries involved, is displayed on the tablet swiping calculator function display.

In one embodiment, the visual indication of the operation, and the two or more numerical data entries involved, as displayed on the tablet swiping calculator function display includes a ghost image, residual display, or other lingering visual indication, of the operation, and the two or more numerical data entries involved.

As noted, in one embodiment, the data, and/or data listing data, including two or more numerical data entries, is financial data arranged as financial transaction entries, including numerical data representing the amount of the respective financial transaction entries, obtained from one or more financial management systems. In one embodiment, the capability to select at least two of the two or more financial transaction entries is provided by allowing a user to select two or more financial transaction entries and then the numerical data representing the amount of the respective financial transaction entries is automatically obtained.

In one embodiment, the capability to select two or more financial transaction entries through the tablet swiping calculator function display is provided by allowing a user to drag and drop the two or more financial transaction entries onto each other and then the numerical data representing the amount of the respective financial transaction entries is automatically obtained.

In one embodiment, as the user drags and drops the two or more financial transaction entries onto each other, a visual indication of the drag and drop operation, and the two or more financial transaction entries involved, and/or numerical data representing the amount of the respective financial transaction entries involved, is displayed on the tablet swiping calculator function display.

In one embodiment, the visual indication of the operation, and the two or more financial transaction entries involved, and/or numerical data representing the amount of the respective financial transaction entries involved, as displayed on the tablet swiping calculator function display includes a ghost image, residual display, or other lingering visual indication, of the operation, and the two or more financial transaction entries involved, and/or numerical data representing the amount of the respective financial transaction entries involved.

In one embodiment, the capability to select two or more financial transaction entries through the tablet swiping calculator function display is provided by allowing a user to hold and swipe the two or more financial transaction entries into each other. Then the numerical data representing the amount of the respective financial transaction entries is automatically obtained. In one embodiment, as the user holds and swipes the two or more financial transaction entries into each other, a visual indication of the hold and swipe operation, and the two or more financial transaction entries involved, and/or numerical data representing the amount of the respective financial transaction entries involved, is displayed on the tablet swiping calculator function display.

In one embodiment, the visual indication of the operation, and the two or more financial transaction entries involved, and/or numerical data representing the amount of the respective financial transaction entries involved, as displayed on the tablet swiping calculator function display includes a ghost image, residual display, or other lingering visual indication, of the operation, and the two or more financial transaction entries involved, and/or numerical data representing the amount of the respective financial transaction entries involved.

In one embodiment, the data, and/or data listing data, including two or more numerical data entries, is financial data arranged as financial transaction entries, including numerical data representing the amount of the respective financial transaction entries and payee data, obtained from one or more financial management systems.

As noted above, financial management systems often either generate or obtain data indicating the payee associated with a financial transaction. In one embodiment, data indicating the payee associated with a financial transaction entry is included in the financial transaction entries listing. In one embodiment, the capability to select two or more financial transaction entries through the tablet swiping calculator function display is provided by allowing a user to select a desired payee. Then all the financial transaction entries including payee data indicating the selected payee are automatically selected, and/or the numerical data representing the amount of the respective financial transaction entries selected, is obtained.

In one embodiment, once the user selects the desired payee and all the financial transaction entries including payee data indicating the selected payee are automatically selected, a visual indication of the operation, and the two or more financial transaction entries involved, and/or numerical data representing the amount of the respective financial transaction entries involved, is displayed on the tablet swiping calculator function display.

In one embodiment, the visual indication of the operation, and the two or more financial transaction entries involved, and/or numerical data representing the amount of the respective financial transaction entries involved, as displayed on the tablet swiping calculator function display includes a ghost image, residual display, or other lingering visual indication, of the operation, and the two or more financial transaction entries involved, and/or numerical data representing the amount of the respective financial transaction entries involved.

In one embodiment, the data, and/or data listing data, including two or more numerical data entries, is financial data arranged as financial transaction entries, including numerical data representing the amount of the respective financial transaction entries and financial category data, obtained from one or more financial management systems.

As noted above, financial management systems often either generate or obtain data indicating the financial category assigned to a financial transaction. In one embodiment, data indicating the financial category assigned to each financial transaction entry is included in the financial transaction entries listing. In one embodiment, the capability to select two or more financial transaction entries through the tablet swiping calculator function display is provided by allowing a user to select a desired financial category. Then all the financial transaction entries including financial category data indicating the selected financial category are automatically selected, and/or the numerical data representing the amount of the respective financial transaction entries selected, is obtained.

In one embodiment, once the user selects the desired financial transaction category and all the financial transaction entries including financial transaction category data indicating the selected financial transaction category are automatically selected, a visual indication of the operation, and the two or more financial transaction entries involved, and/or numerical data representing the amount of the respective financial transaction entries involved, is displayed on the tablet swiping calculator function display.

In one embodiment, the visual indication of the operation, and the two or more financial transaction entries involved, and/or numerical data representing the amount of the respective financial transaction entries involved, as displayed on the tablet swiping calculator function display includes a ghost image, residual display, or other lingering visual indication, of the operation, and the two or more financial transaction entries involved, and/or numerical data representing the amount of the respective financial transaction entries involved.

In one embodiment, the capability to select at least two of the two or more numerical data entries through the tablet swiping calculator function display is provided by any means, mechanism, method, or system for selecting numerical data entries, as discussed herein, and/or as known in the art at the time of filing, and/or as developed after the time of filing.

It is worth noting that none of the illustrative capabilities to select at least two of the two or more numerical data entries through the tablet swiping calculator function display discussed above require significant manual data entry beyond, at most, selecting, e.g., touching, tapping, or clicking on, two or more numerical data entries. In addition, when financial transaction entries are involved, the user need only select, e.g., touch, tap, or click on, the financial transaction entries and then numerical data representing the amount of the respective financial transaction entries is obtained.

As noted, while a "qwerty" keyboard can be made to fit in a space less than 2 inches wide on a smart phone, that fact doesn't make it easy or efficient to use. Consequently, by eliminating manual entry of numerical values in order to perform a mathematical operation involving the numerical values, the process for providing a tablet swiping calculator function makes using a calculator function easier, more efficient, and more user friendly, particularly in a mobile computing environment.

In one embodiment, once a capability to select at least one mathematical operation is provided, and a mathematical operation is selected through the tablet swiping calculator function display, and the capability to select at least two numerical data entries through the tablet swiping calculator function display is provided, and two or more numerical data entries are selected through the tablet swiping calculator function display, the selected mathematical operation is automatically performed on the selected numerical data entries and results data is generated.

In one embodiment, once a capability to select at least one mathematical operation is provided, and a mathematical operation is selected through the tablet swiping calculator function display, and the capability to select at least two numerical data entries through the tablet swiping calculator function display is provided, and two or more numerical data entries are selected through the tablet swiping calculator function display, the selected mathematical operation is semi-automatically performed on the selected numerical data entries by the user performing an additional input action, such as touching, taping, or double tapping, in the tablet swiping calculator function display. Then results data is generated.

Using the system and method for providing a tablet swiping calculator function discussed herein, a user is provided the capability to select a desired mathematical operation and at least two numerical data entries to be operated on by the selected mathematical operation through the tablet swiping calculator function display; all without requiring any significant manual data entry beyond, at most, selecting the mathematical operation and two or more numerical data entries. In addition, when financial transaction entries are involved, the user need only select the financial transaction entries and then numerical data representing the amount of the respective financial transaction entries is automatically obtained. Consequently, the system and method for providing a tablet swiping calculator function discussed herein makes using a calculator function easier, more efficient, and more user friendly, particularly in a mobile computing environment.

Hardware System Architecture

FIG. 1 is a block diagram of an exemplary hardware architecture for implementing one embodiment of a process for providing a tablet swiping calculator function, such as exemplary process 200 (FIG. 2) discussed herein.

FIG. 1 includes computing system 100. As seen in FIG. 1, computing system 100 includes Central Processing Unit (CPU) 101, memory 105, data management system 102, calculator module 110, and display device 140.

Financial management system 102 is any computing system implemented financial management system as discussed herein, and/or as known/available in the art at the time of filing, and/or as developed/made available after the time of filing. In one embodiment data listing data 103 is obtained from financial management system 102 and is then displayed in tablet swiping calculator function display 141 on display device 140.

In one embodiment, user input data 130 is obtained from tablet swiping calculator function display 141 via display device 140. In one embodiment, display device 140 is a touch screen on a mobile computing system and user input data 130 is obtained by user interaction with display device 140 via touch, or another form of user interface/input device.

In one embodiment, user input data includes mathematical operation (MO) selection data 134 indicating the user's selection of a desired mathematical operation such as, but not limited to, addition, subtraction, multiplication, or division through tablet swiping calculator function display 141. In one embodiment, MO selection data 134 is transferred to mathematical operations selection module 123 of process module 120 and then onto mathematical operation module 113 of calculator module 110.

In one embodiment, user input data includes selected numerical data 136 indicating the user's selection of two or more numerical data entries of the numerical data entries of data listing data 103 through tablet swiping calculator function display 141. In one embodiment, selected numerical data 136 is transferred to numerical data selection module 125 of process module 120 and then onto calculation module 115.

In one embodiment, at calculation module 125 the selected mathematical operation of MO selection data 134 is performed on the selected two or more numerical data entries of selected numerical data 136 to transform the two or more numerical data entries of selected numerical data 136 into results data 117.

In one embodiment, results data 117 is then transferred to results display module 127 which generates results display 137 on tablet swiping calculator function display 141.

In various embodiments, computing system 100 may further include standard user interface devices such as a keyboard (not shown), a mouse (not shown), a printer (not shown), as well as, one or more standard input/output (I/O) devices (not shown), such as a compact disk (CD) or Digital Video Disc (DVD) drive, floppy disk drive, or other digital or waveform port, or other device capable of inputting data to, and outputting data from, computing system 100, whether available or known at the time of filing or as later developed.

As noted, in one embodiment, computing system 100 is a mobile computing system, such as a smart phone. However, computing system 100 can be any computing system as discussed herein, and/or as known in the art at the time of filing, and/or as developed thereafter, that includes components that can execute all, or part, of a process for providing a tablet swiping calculator function in accordance with at least one of the embodiments as described herein.

In the discussion above, certain aspects of one embodiment include processes, sub-processes, steps, operations and/or instructions described herein for illustrative purposes in a particular order and/or grouping. However, the particular order and/or grouping shown and discussed herein are illustrative only and not limiting. Those of skill in the art will recognize that other orders and/or grouping of the processes, sub-processes, steps, operations and/or instructions are possible and, in some embodiments, one or more of the processes, sub-processes, steps, operations and/or instructions discussed above can be combined and/or deleted. In addition, portions of one or more of the processes, sub-processes, steps, operations and/or instructions can be re-grouped as portions of one or more other of processes, sub-processes, steps, operations and/or instructions discussed herein. Consequently, the particular order and/or grouping of the processes, sub-processes, steps, operations and/or instructions discussed herein do not limit the scope of the invention as claimed below.

Process

In accordance with one embodiment, a process for providing a tablet swiping calculator function includes providing a listing of data in a tablet swiping calculator function display with the listing of data including two or more numerical data entries. In one embodiment, a capability to select at least one mathematical operation is provided through the tablet swiping calculator function display, along with the capability to select at least two of the two or more numerical data entries through the tablet swiping calculator function display. In one embodiment, when the at least two numerical data entries are selected, the selected mathematical operation is automatically, or semi-automatically, performed on the selected numerical data entries and the results are displayed on the tablet swiping calculator function display.

Figure 2:
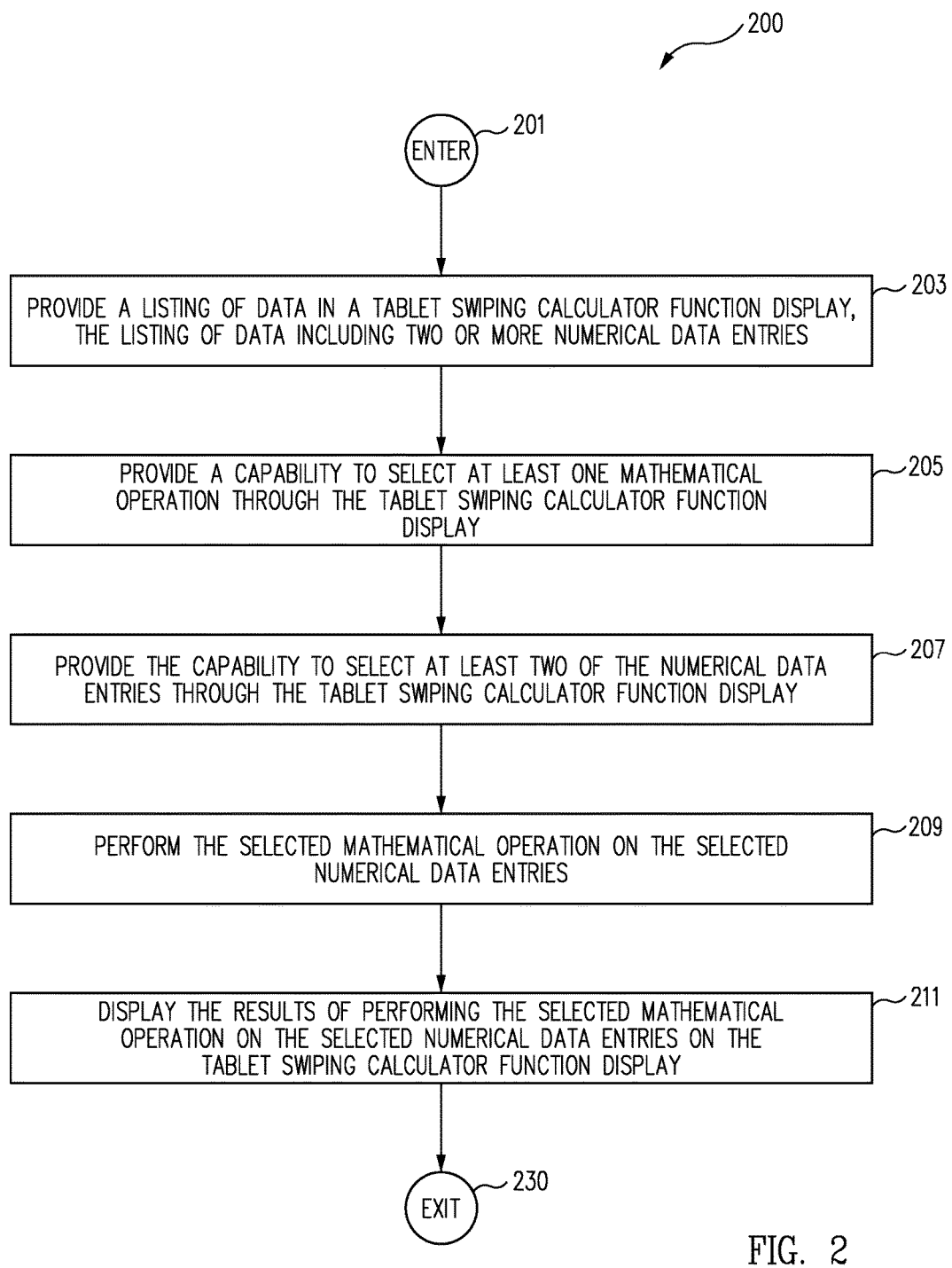
FIG. 2 is a flow chart depicting a process for providing a tablet swiping calculator function in accordance with one embodiment.

FIG. 2 is a flow chart depicting a process 200 for providing a tablet swiping calculator function in accordance with one embodiment. Process 200 for providing a tablet swiping calculator function begins at ENTER OPERATION 201 of FIG. 2 and process flow proceeds to PROVIDE A LISTING OF DATA IN A TABLET SWIPING CALCULATOR FUNCTION DISPLAY, THE LISTING OF DATA INCLUDING TWO OR MORE NUMERICAL DATA ENTRIES OPERATION 203.

In one embodiment, at PROVIDE A LISTING OF DATA IN A TABLET SWIPING CALCULATOR FUNCTION DISPLAY, THE LISTING OF DATA INCLUDING TWO OR MORE NUMERICAL DATA ENTRIES OPERATION 203 data is obtained in the form of a data listing, or listing of data entries.

In one embodiment, the data listing of PROVIDE A LISTING OF DATA IN A TABLET SWIPING CALCULATOR FUNCTION DISPLAY, THE LISTING OF DATA INCLUDING TWO OR MORE NUMERICAL DATA ENTRIES OPERATION 203 includes two or more numerical data entries. In various embodiments, at least part of the data listing is then displayed in a tablet swiping calculator function display on a display device associated with a computing system associated with, or otherwise accessible by, a user.

In one embodiment, the data, and/or data listing data with two or more numerical data entries, is obtained at PROVIDE A LISTING OF DATA IN A TABLET SWIPING CALCULATOR FUNCTION DISPLAY, THE LISTING OF DATA INCLUDING TWO OR MORE NUMERICAL DATA ENTRIES OPERATION 203 from one or more data management systems. As used herein, the term "data management system" includes, but is not limited to: computing system implemented, and/or online, business and/or personal financial management systems, packages, programs, modules, or applications; computing system implemented, and/or online, business and/or personal tax preparation systems, packages, programs, modules, or applications; computing system implemented, and/or online, business and/or personal accounting and/or invoicing systems, packages, programs, modules, or applications; computing system implemented, and/or online, banking systems, packages, programs, modules, or applications; and various other electronic data management systems, packages, programs, modules, or applications, whether known at the time of filling or as developed later.

In one embodiment, the data, and/or data listing data, including two or more numerical data entries of PROVIDE A LISTING OF DATA IN A TABLET SWIPING CALCULATOR FUNCTION DISPLAY, THE LISTING OF DATA INCLUDING TWO OR MORE NUMERICAL DATA ENTRIES OPERATION 203, is financial data arranged as financial transaction entries, including numerical data representing the amount of the respective financial transaction entries, obtained from one or more financial management systems.

Herein, a "financial management system" can be, but is not limited to, any of the following: a computing system implemented personal and/or business financial transaction management system; a computing system implemented personal and/or business financial management system; a computing system implemented personal and/or business asset management system; a computing system implemented personal and/or business accounting system; a computing system implemented point of sale system; and/or any of the numerous computing system implemented financial management systems known to those of skill in the art.

FIG. 3A shows an illustrative example of a tablet swiping calculator function display 141 as displayed on a display device 140, such as display device 140 of computing system 100 of FIG. 1, at PROVIDE A LISTING OF DATA IN A TABLET SWIPING CALCULATOR FUNCTION DISPLAY, THE LISTING OF DATA INCLUDING TWO OR MORE NUMERICAL DATA ENTRIES OPERATION 203 (FIG. 2).

As seen in FIG. 3A, tablet swiping calculator function display 141 includes data listing 303 including a list of financial transaction entries and numerical transaction amount data 304 associated with the financial transaction entries obtained from a financial management system.

Returning to FIG. 2, in one embodiment, once data is obtained in the form of a data listing, or listing of data entries, at PROVIDE A LISTING OF DATA IN A TABLET SWIPING CALCULATOR FUNCTION DISPLAY, THE LISTING OF DATA INCLUDING TWO OR MORE NUMERICAL DATA ENTRIES OPERATION 203, process flow proceeds to PROVIDE A CAPABILITY TO SELECT AT LEAST ONE MATHEMATICAL OPERATION THROUGH THE TABLET SWIPING CALCULATOR FUNCTION DISPLAY OPERATION 205.

In one embodiment, at PROVIDE A CAPABILITY TO SELECT AT LEAST ONE MATHEMATICAL OPERATION THROUGH THE TABLET SWIPING CALCULATOR FUNCTION DISPLAY OPERATION 205, a capability to select at least one mathematical operation is provided through the tablet swiping calculator function display.

In one embodiment, the capability to select at least one mathematical operation is provided through the tablet swiping calculator function display at PROVIDE A CAPABILITY TO SELECT AT LEAST ONE MATHEMATICAL OPERATION THROUGH THE TABLET SWIPING CALCULATOR FUNCTION DISPLAY OPERATION 205 via displayed mathematical operation icons or listings that can be activated through the tablet swiping calculator function display, in one embodiment, using a touch screen and a finger, stylus, or other user interface device.

Returning to FIG. 3A, tablet swiping calculator function display 141 includes, in this specific illustrative example, mathematical operation icon display wheel 305 including addition icon 306, subtraction icon 307, multiplication icon 308 and division icon 309. In this specific illustrative example, each of the icons of icon display wheel 305 indicate, and/or are linked to, respective mathematical operations to be performed by a calculation module, such as calculation module 115 of FIG. 1 associated with process 200 for providing a tablet swiping calculator function.

In other embodiments, the capability to select at least one mathematical operation is provided through the tablet swiping calculator function display at PROVIDE A CAPABILITY TO SELECT AT LEAST ONE MATHEMATICAL OPERATION THROUGH THE TABLET SWIPING CALCULATOR FUNCTION DISPLAY OPERATION 205 via a touch screen and user input in the form of the user drawing, or sketching, a defined mathematical operation symbol on the tablet swiping calculator function display using a finger, stylus, or other user interface device. For instance, in one embodiment, the user draws a plus sign/symbol (+), a minus sign/symbol (−), a multiplication sign/symbol (X), or a division sign/symbol (÷) or (/) on the tablet swiping calculator function display using a finger, stylus, or other user interface device.

In one embodiment, once a capability to select at least one mathematical operation is provided, and a mathematical operation is selected through the tablet swiping calculator function display, at PROVIDE A CAPABILITY TO SELECT AT LEAST ONE MATHEMATICAL OPERATION THROUGH THE TABLET SWIPING CALCULATOR FUNCTION DISPLAY OPERATION 205, data indicating the selected mathematical operation is stored in a memory or other database associated with process 200 for providing a tablet swiping calculator function.

As used herein, the term "database" includes, but is not limited to, any data storage mechanism known at the time of filing, or as developed thereafter, such as, but not limited to, a hard drive or memory; a designated server system or computing system, or a designated portion of one or more server systems or computing systems; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to any data storage means that is part of, or under the control of, any computing system, as discussed herein, known at the time of filing, or as developed thereafter.

In one embodiment, once a capability to select at least one mathematical operation is provided through the tablet swiping calculator function display at PROVIDE A CAPABILITY TO SELECT AT LEAST ONE MATHEMATICAL OPERATION THROUGH THE TABLET SWIPING CALCULATOR FUNCTION DISPLAY OPERATION 205, process flow proceeds to PROVIDE THE CAPABILITY TO SELECT AT LEAST TWO OF THE NUMERICAL DATA ENTRIES THROUGH THE TABLET SWIPING CALCULATOR FUNCTION DISPLAY OPERATION 207.

As noted above, as mobile computing systems, such as smart phones, have emerged as the preferred platform for information access and computing for an increasingly large percentage of computing system users, there is an increased need to ensure that data entry, and data processing functions, can be performed with minimal manual user input and through small form factor display screens. However, currently, calculator functions that perform a mathematical operation on two or more numerical data entries currently require significant manual data entry.

For instance, in order to perform the simple addition of three numbers, say 100, 200, and 300, a user must first individually enter the three digits "1", "0", and "0". Then the user must indicate what operation is desired, typically by selecting an icon, in this specific illustrative example, the addition sign icon. Then, in this specific illustrative example, the user must individually enter the three digits "2", "0", and "0". Then the user must request the operation be performed, typically by selecting the "=" symbol. Then the user must individually enter the three digits "3", "0", and "0" and again indicate what operation is desired, or vice versa, depending on the particular system being used. Finally the user must again request the operation be performed, typically by selecting the "=" symbol.

In contrast to this prior methodology, and to eliminate this significant amount of manual data entry, in one embodiment, once a capability to select at least one mathematical operation is provided at PROVIDE A CAPABILITY TO SELECT AT LEAST ONE MATHEMATICAL OPERATION THROUGH THE TABLET SWIPING CALCULATOR FUNCTION DISPLAY OPERATION 205, and a mathematical operation is selected through the tablet swiping calculator function display, at PROVIDE THE CAPABILITY TO SELECT AT LEAST TWO OF THE NUMERICAL DATA ENTRIES THROUGH THE TABLET SWIPING CALCULATOR FUNCTION DISPLAY OPERATION 207 the capability to select at least two of the two or more numerical data entries of the numerical data entries list through the tablet swiping calculator function display is provided.

In one embodiment, the capability to select at least two of the two or more numerical data entries through the tablet swiping calculator function display is provided at PROVIDE THE CAPABILITY TO SELECT AT LEAST TWO OF THE NUMERICAL DATA ENTRIES THROUGH THE TABLET SWIPING CALCULATOR FUNCTION DISPLAY OPERATION 207, by allowing a user to drag and drop the numerical data entries onto each other.

In one embodiment, as the user drags and drops the numerical data entries onto each other at PROVIDE THE CAPABILITY TO SELECT AT LEAST TWO OF THE NUMERICAL DATA ENTRIES THROUGH THE TABLET SWIPING CALCULATOR FUNCTION DISPLAY OPERATION 207, a visual indication of the drag and drop operation, and the numerical data entries involved, is displayed on the tablet swiping calculator function display.

In one embodiment, the visual indication of the operation, and the two or more numerical data entries involved, as displayed on the tablet swiping calculator function display includes a ghost image, residual display, or other lingering visual indication, of the operation, and the two or more numerical data entries involved.

In one embodiment, the capability to select at least two of the two or more numerical data entries through the tablet swiping calculator function display is provided at PROVIDE THE CAPABILITY TO SELECT AT LEAST TWO OF THE NUMERICAL DATA ENTRIES THROUGH THE TABLET SWIPING CALCULATOR FUNCTION DISPLAY OPERATION 207 by allowing a user to hold and swipe the numerical data entries into each other.

In one embodiment, as the user holds and swipes the numerical data entries into each other at PROVIDE THE CAPABILITY TO SELECT AT LEAST TWO OF THE NUMERICAL DATA ENTRIES THROUGH THE TABLET SWIPING CALCULATOR FUNCTION DISPLAY OPERATION 207, a visual indication of the hold and swipe operation, and the numerical data entries involved, is displayed on the tablet swiping calculator function display.

In one embodiment, the visual indication of the operation, and the two or more numerical data entries involved, as displayed on the tablet swiping calculator function display includes a ghost image, residual display, or other lingering visual indication, of the operation, and the two or more numerical data entries involved.

Figure 3B:
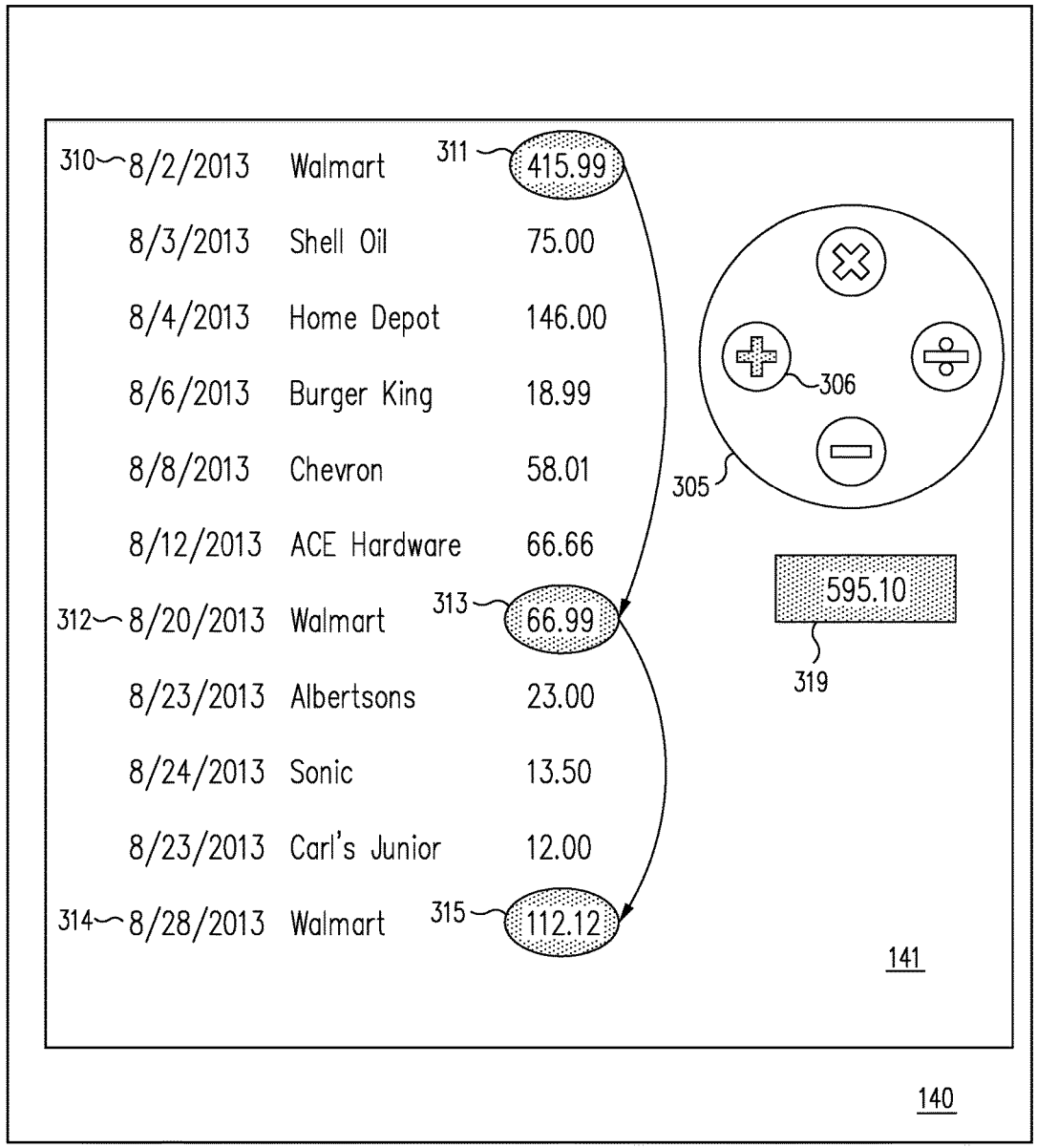
FIG. 3B shows the tablet swiping calculator function display of FIG. 3A including a data listing with three transaction entries and their associated numerical data being selected for addition in a drag and drop, or hold and swipe, operation in accordance with one embodiment.

FIG. 3B shows the tablet swiping calculator function display 141 of FIG. 3A including data listing 303 with three transaction entries, 310, 312, and 314, and their associated numerical data 311, 313, and 315, respectively, indicating the amount of each of the transaction entries, being selected for addition.

As seen in FIG. 3B, addition icon 306 has been selected at PROVIDE A CAPABILITY TO SELECT AT LEAST ONE MATHEMATICAL OPERATION THROUGH THE TABLET SWIPING CALCULATOR FUNCTION DISPLAY OPERATION 205.

As also seen in FIG. 3B transaction entries 310, 312 and 314 are being selected at PROVIDE THE CAPABILITY TO SELECT AT LEAST TWO OF THE NUMERICAL DATA ENTRIES THROUGH THE TABLET SWIPING CALCULATOR FUNCTION DISPLAY OPERATION 207 in a drag and drop, or hold and swipe, operation.

As seen in FIG. 3B, as the user drags and drops, or holds and swipes, transaction entries 310, 312 and 314 onto/into each other at PROVIDE THE CAPABILITY TO SELECT AT LEAST TWO OF THE NUMERICAL DATA ENTRIES THROUGH THE TABLET SWIPING CALCULATOR FUNCTION DISPLAY OPERATION 207, a visual indication of the drag and drop, or hold and swipe, operation, and the numerical data entries 311, 313, and 315 involved, is displayed on the tablet swiping calculator function display 141.

In addition, it is worth noting that while the actual transaction entries, 310, 312, and 314, are being selected, only the numerical data entries 311, 313, and 315 involved are being manipulated and the sum of the numerical data entries 311, 313, and 315 is displayed in results data display field 319.

In one embodiment, the visual indication of the operation of FIG. 3B, and the numerical data entries 311, 313, and 315 involved, is displayed on the tablet swiping calculator function display 141 of FIG. 3B as a ghost image, residual display, or other lingering visual indication, of the operation, and the numerical data entries 311, 313, and 315 involved.

Returning to FIG. 2, as noted, in one embodiment, the data, and/or data listing data, including two or more numerical data entries of PROVIDE A LISTING OF DATA IN A TABLET SWIPING CALCULATOR FUNCTION DISPLAY, THE LISTING OF DATA INCLUDING TWO OR MORE NUMERICAL DATA ENTRIES OPERATION 203, is financial data arranged as financial transaction entries, including numerical data representing the amount of the respective financial transaction entries, obtained from one or more financial management systems.

In one embodiment, the capability to select at least two of the two or more numerical data entries through the tablet swiping calculator function display is provided at PROVIDE THE CAPABILITY TO SELECT AT LEAST TWO OF THE NUMERICAL DATA ENTRIES THROUGH THE TABLET SWIPING CALCULATOR FUNCTION DISPLAY OPERATION 207 by allowing a user to select two or more financial transaction entries and then the numerical data representing the amount of the respective financial transaction entries is automatically obtained.

In one embodiment, the capability to select two or more financial transaction entries through the tablet swiping calculator function display is provided at PROVIDE THE CAPABILITY TO SELECT AT LEAST TWO OF THE NUMERICAL DATA ENTRIES THROUGH THE TABLET SWIPING CALCULATOR FUNCTION DISPLAY OPERATION 207 by allowing a user to drag and drop the two or more financial transaction entries onto each other and then the numerical data representing the amount of the respective financial transaction entries is automatically obtained.

In one embodiment, as the user drags and drops the two or more financial transaction entries onto each other at PROVIDE THE CAPABILITY TO SELECT AT LEAST TWO OF THE NUMERICAL DATA ENTRIES THROUGH THE TABLET SWIPING CALCULATOR FUNCTION DISPLAY OPERATION 207, a visual indication of the drag and drop operation, and the two or more financial transaction entries involved, and/or numerical data representing the amount of the respective financial transaction entries involved, is displayed on the tablet swiping calculator function display.

In one embodiment, the visual indication of the operation, and the two or more financial transaction entries involved, and/or numerical data representing the amount of the respective financial transaction entries involved, as displayed on the tablet swiping calculator function display includes a ghost image, residual display, or other lingering visual indication, of the operation, and the two or more financial transaction entries involved, and/or numerical data representing the amount of the respective financial transaction entries involved.

In one embodiment, the capability to select two or more financial transaction entries through the tablet swiping calculator function display is provided at PROVIDE THE CAPABILITY TO SELECT AT LEAST TWO OF THE NUMERICAL DATA ENTRIES THROUGH THE TABLET SWIPING CALCULATOR FUNCTION DISPLAY OPERATION 207 by allowing a user to hold and swipe the two or more financial transaction entries into each other. Then the numerical data representing the amount of the respective financial transaction entries is automatically obtained.

In one embodiment, as the user holds and swipes the two or more financial transaction entries into each other at PROVIDE THE CAPABILITY TO SELECT AT LEAST TWO OF THE NUMERICAL DATA ENTRIES THROUGH THE TABLET SWIPING CALCULATOR FUNCTION DISPLAY OPERATION 207, a visual indication of the hold and swipe operation, and the two or more financial transaction entries involved, and/or numerical data representing the amount of the respective financial transaction entries involved, is displayed on the tablet swiping calculator function display.

In one embodiment, the visual indication of the operation, and the two or more financial transaction entries involved, and/or numerical data representing the amount of the respective financial transaction entries involved, as displayed on the tablet swiping calculator function display includes a ghost image, residual display, or other lingering visual indication, of the operation, and the two or more financial transaction entries involved, and/or numerical data representing the amount of the respective financial transaction entries involved.

Figure 3C:
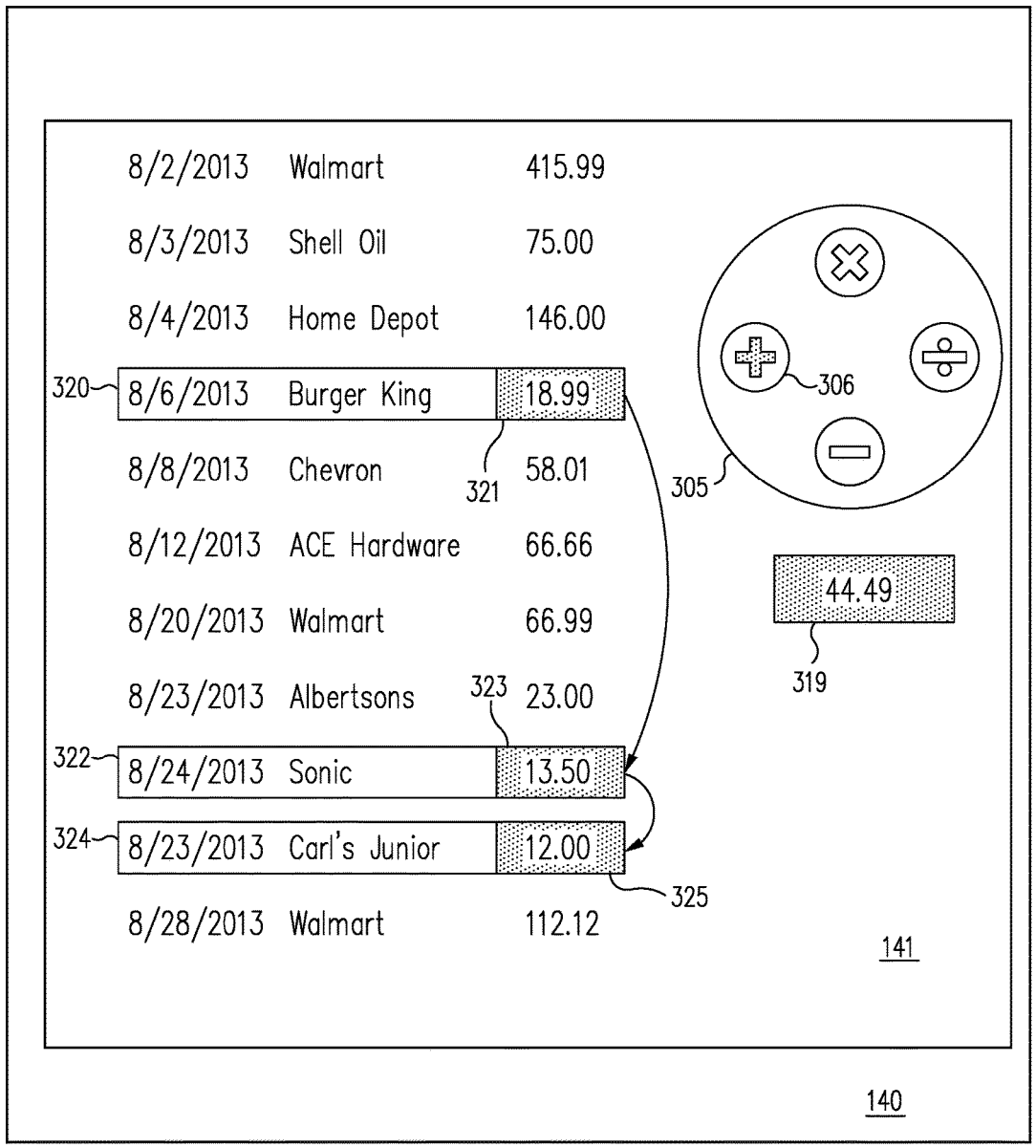
FIG. 3C shows the tablet swiping calculator function display of FIG. 3A including a data listing with three transaction entries and their associated numerical data being selected for addition in a drag and drop, or hold and swipe, operation in accordance with one embodiment.

FIG. 3C shows the tablet swiping calculator function display 141 of FIG. 3A including data listing 303 with three transaction entries, 320, 322, and 324, and their associated numerical data 321, 323, and 325, respectively, indicating the amount of each of the transaction entries, being selected for addition.

As seen in FIG. 3C, addition icon 306 has been selected at PROVIDE A CAPABILITY TO SELECT AT LEAST ONE MATHEMATICAL OPERATION THROUGH THE TABLET SWIPING CALCULATOR FUNCTION DISPLAY OPERATION 205.

As also seen in FIG. 3C, transaction entries 320, 322 and 324 are being selected at PROVIDE THE CAPABILITY TO SELECT AT LEAST TWO OF THE NUMERICAL DATA ENTRIES THROUGH THE TABLET SWIPING CALCULATOR FUNCTION DISPLAY OPERATION 207 in a drag and drop, or hold and swipe, operation.

As seen in FIG. 3C, as the user drags and drops, or holds and swipes, transaction entries 320, 322 and 324 onto/into each other at PROVIDE THE CAPABILITY TO SELECT AT LEAST TWO OF THE NUMERICAL DATA ENTRIES THROUGH THE TABLET SWIPING CALCULATOR FUNCTION DISPLAY OPERATION 207, a visual indication of the drag and drop, or hold and swipe, operation, and the numerical data entries 321, 323, and 325 involved, is displayed on the tablet swiping calculator function display 141.

Again, it is worth noting that while the actual transaction entries, 320, 322, and 324, are being selected, only the numerical data entries 321, 323, and 325 involved are being manipulated and the sum of the numerical data entries 321, 323, and 325 is displayed in results data display field 319.

In one embodiment, the visual indication of the operation of FIG. 3C, and the numerical data entries 321, 323, and 325 involved, is displayed on the tablet swiping calculator function display 141 of FIG. 3C as a ghost image, residual display, or other lingering visual indication, of the operation, and the numerical data entries 321, 323, and 325 involved.

Returning to FIG. 2, In one embodiment, the data, and/or data listing data, including two or more numerical data entries of PROVIDE A LISTING OF DATA IN A TABLET SWIPING CALCULATOR FUNCTION DISPLAY, THE LISTING OF DATA INCLUDING TWO OR MORE NUMERICAL DATA ENTRIES OPERATION 203, is financial data arranged as financial transaction entries, including numerical data representing the amount of the respective financial transaction entries and payee data, obtained from one or more financial management systems.

As noted above, financial management systems often either generate or obtain data indicating the payee associated with a financial transaction. In one embodiment, data indicating the payee associated with a financial transaction entry is included in the financial transaction entries listing of PROVIDE A LISTING OF DATA IN A TABLET SWIPING CALCULATOR FUNCTION DISPLAY, THE LISTING OF DATA INCLUDING TWO OR MORE NUMERICAL DATA ENTRIES OPERATION 203.

In one embodiment, the capability to select two or more financial transaction entries through the tablet swiping calculator function display is provided at PROVIDE THE CAPABILITY TO SELECT AT LEAST TWO OF THE NUMERICAL DATA ENTRIES THROUGH THE TABLET SWIPING CALCULATOR FUNCTION DISPLAY OPERATION 207 by allowing a user to select a desired payee. Then all the financial transaction entries including payee data indicating the selected payee are automatically selected, and/or the numerical data representing the amount of the respective financial transaction entries selected, is obtained.

In one embodiment, once the user selects the desired payee and all the financial transaction entries including payee data indicating the selected payee are automatically selected at PROVIDE THE CAPABILITY TO SELECT AT LEAST TWO OF THE NUMERICAL DATA ENTRIES THROUGH THE TABLET SWIPING CALCULATOR FUNCTION DISPLAY OPERATION 207, a visual indication of the operation, and the two or more financial transaction entries involved, and/or numerical data representing the amount of the respective financial transaction entries involved, is displayed on the tablet swiping calculator function display.

In one embodiment, the visual indication of the operation, and the two or more financial transaction entries involved, and/or numerical data representing the amount of the respective financial transaction entries involved, as displayed on the tablet swiping calculator function display includes a ghost image, residual display, or other lingering visual indication, of the operation, and the two or more financial transaction entries involved, and/or numerical data representing the amount of the respective financial transaction entries involved.

FIG. 3D shows the tablet swiping calculator function display 141 of FIG. 3A including data listing 303 with two transaction entries, 330 and 332 and their associated numerical data 331 and 333 respectively, indicating the amount of each of the transaction entries, being selected for addition.

As seen in FIG. 3D, addition icon 306 has been selected at PROVIDE A CAPABILITY TO SELECT AT LEAST ONE MATHEMATICAL OPERATION THROUGH THE TABLET SWIPING CALCULATOR FUNCTION DISPLAY OPERATION 205.

As also seen in FIG. 3D, transaction entries 330 and 332 have the same payee, i.e., Walmart, and are being selected at PROVIDE THE CAPABILITY TO SELECT AT LEAST TWO OF THE NUMERICAL DATA ENTRIES THROUGH THE TABLET SWIPING CALCULATOR FUNCTION DISPLAY OPERATION 207 in response to a user selecting Walmart as the desired payee.

In response to the user selecting Walmart as the desired payee, transaction entries 330 and 332 are selected and their associated numerical data 331 and 333 is added with the results shown in results data field 319.

Again, it is worth noting that while the actual transaction entries 330 and 332 are being selected, only the numerical data entries 331 and 333 involved are being manipulated and the sum of the numerical data entries 331 and 333 is displayed in results data display field 319.

In one embodiment, a visual indication of the operation of FIG. 3D, and the numerical data entries 331 and 333, is displayed on the tablet swiping calculator function display 141 of FIG. 3D as a ghost image, residual display, or other lingering visual indication, of the operation, and the numerical data entries involved.

Returning to FIG. 2, in one embodiment, the data, and/or data listing data, including two or more numerical data entries of PROVIDE A LISTING OF DATA IN A TABLET SWIPING CALCULATOR FUNCTION DISPLAY, THE LISTING OF DATA INCLUDING TWO OR MORE NUMERICAL DATA ENTRIES OPERATION 203, is financial data arranged as financial transaction entries, including numerical data representing the amount of the respective financial transaction entries and financial category data, obtained from one or more financial management systems.

As noted above, financial management systems often either generate or obtain data indicating the financial category assigned to a financial transaction. In one embodiment, data indicating the financial category assigned to each financial transaction entry is included in the financial transaction entries listing of PROVIDE A LISTING OF DATA IN A TABLET SWIPING CALCULATOR FUNCTION DISPLAY, THE LISTING OF DATA INCLUDING TWO OR MORE NUMERICAL DATA ENTRIES OPERATION 203.

In one embodiment, the capability to select two or more financial transaction entries through the tablet swiping calculator function display is provided at PROVIDE THE CAPABILITY TO SELECT AT LEAST TWO OF THE NUMERICAL DATA ENTRIES THROUGH THE TABLET SWIPING CALCULATOR FUNCTION DISPLAY OPERATION 207 by allowing a user to select a desired financial category. Then all the financial transaction entries including financial category data indicating the selected financial category are automatically selected, and/or the numerical data representing the amount of the respective financial transaction entries selected, is obtained.

In one embodiment, once the user selects the desired financial transaction category and all the financial transaction entries including financial transaction category data indicating the selected financial transaction category are automatically selected at PROVIDE THE CAPABILITY TO SELECT AT LEAST TWO OF THE NUMERICAL DATA ENTRIES THROUGH THE TABLET SWIPING CALCULATOR FUNCTION DISPLAY OPERATION 207, a visual indication of the operation, and the two or more financial transaction entries involved, and/or numerical data representing the amount of the respective financial transaction entries involved, is displayed on the tablet swiping calculator function display.

In one embodiment, the visual indication of the operation, and the two or more financial transaction entries involved, and/or numerical data representing the amount of the respective financial transaction entries involved, as displayed on the tablet swiping calculator function display includes a ghost image, residual display, or other lingering visual indication, of the operation, and the two or more financial transaction entries involved, and/or numerical data representing the amount of the respective financial transaction entries involved.

In one embodiment, the capability to select at least two of the two or more numerical data entries through the tablet swiping calculator function display is provided at PROVIDE THE CAPABILITY TO SELECT AT LEAST TWO OF THE NUMERICAL DATA ENTRIES THROUGH THE TABLET SWIPING CALCULATOR FUNCTION DISPLAY OPERATION 207 by any means, mechanism, method, or system for selecting numerical data entries, as discussed herein, and/or as known in the art at the time of filing, and/or as developed after the time of filing.

It is worth noting that none of the illustrative capabilities to select at least two of the two or more numerical data entries through the tablet swiping calculator function display discussed above require significant manual data entry beyond, at most, selecting, e.g., touching, tapping, or clicking on, two or more numerical data entries. In addition, when financial transaction entries are involved, the user need only select, e.g., touch, tap, or click on, the financial transaction entries and then numerical data representing the amount of the respective financial transaction entries is obtained.

As noted, while a "qwerty" keyboard can be made to fit in a space less than 2 inches wide on a smart phone, that fact doesn't make it easy or efficient to use. Consequently, by eliminating manual entry of numerical values in order to perform a mathematical operation involving the numerical values, process 200 for providing a tablet swiping calculator function makes using a calculator function easier, more efficient, and more user friendly, particularly in a mobile computing environment.

In one embodiment, once the capability to select at least two of the two or more numerical data entries of the numerical data entries list through the tablet swiping calculator function display is provided at PROVIDE THE CAPABILITY TO SELECT AT LEAST TWO OF THE NUMERICAL DATA ENTRIES THROUGH THE TABLET SWIPING CALCULATOR FUNCTION DISPLAY OPERATION 207, and two or more numerical data entries are selected through the tablet swiping calculator function display, process flow proceeds to PERFORM THE SELECTED MATHEMATICAL OPERATION ON THE SELECTED NUMERICAL DATA ENTRIES OPERATION 209.

In one embodiment, once a capability to select at least one mathematical operation is provided, and a mathematical operation is selected through the tablet swiping calculator function display, at PROVIDE A CAPABILITY TO SELECT AT LEAST ONE MATHEMATICAL OPERATION THROUGH THE TABLET SWIPING CALCULATOR FUNCTION DISPLAY OPERATION 205, and the capability to select at least two numerical data entries through the tablet swiping calculator function display is provided, and two or more numerical data entries are selected through the tablet swiping calculator function display at PROVIDE THE CAPABILITY TO SELECT AT LEAST TWO OF THE NUMERICAL DATA ENTRIES THROUGH THE TABLET SWIPING CALCULATOR FUNCTION DISPLAY OPERATION 207, the selected mathematical operation is semi-automatically or automatically performed on the selected numerical data entries and results data is generated at PERFORM THE SELECTED MATHEMATICAL OPERATION ON THE SELECTED NUMERICAL DATA ENTRIES OPERATION 209.

In one embodiment, once a capability to select at least one mathematical operation is provided, and a mathematical operation is selected through the tablet swiping calculator function display, and the capability to select at least two numerical data entries through the tablet swiping calculator function display is provided, and two or more numerical data entries are selected through the tablet swiping calculator function display, at PERFORM THE SELECTED MATHEMATICAL OPERATION ON THE SELECTED NUMERICAL DATA ENTRIES OPERATION 209, the selected mathematical operation is semi-automatically performed on the selected numerical data entries by the user performing an additional input action, such as touching, taping, or double tapping, in the tablet swiping calculator function display, and then results data is generated.

In one embodiment, once a capability to select at least one mathematical operation is provided, and a mathematical operation is selected through the tablet swiping calculator function display, and the capability to select at least two numerical data entries through the tablet swiping calculator function display is provided, and two or more numerical data entries are selected through the tablet swiping calculator function display, at PERFORM THE SELECTED MATHEMATICAL OPERATION ON THE SELECTED NUMERICAL DATA ENTRIES OPERATION 209, the selected mathematical operation is automatically performed on the selected numerical data entries without any further user input action and then results data is generated.

In one embodiment, once the selected mathematical operation is semi-automatically or automatically performed on the selected numerical data entries and results data is generated at PERFORM THE SELECTED MATHEMATICAL OPERATION ON THE SELECTED NUMERICAL DATA ENTRIES OPERATION 209, process flow proceeds to DISPLAY THE RESULTS OF PERFORMING THE SELECTED MATHEMATICAL OPERATION ON THE SELECTED NUMERICAL DATA ENTRIES ON THE TABLET SWIPING CALCULATOR FUNCTION DISPLAY OPERATION 211.

In one embodiment, at DISPLAY THE RESULTS OF PERFORMING THE SELECTED MATHEMATICAL OPERATION ON THE SELECTED NUMERICAL DATA ENTRIES ON THE TABLET SWIPING CALCULATOR FUNCTION DISPLAY OPERATION 211 the results data of PERFORM THE SELECTED MATHEMATICAL OPERATION ON THE SELECTED NUMERICAL DATA ENTRIES OPERATION 209 is displayed on the tablet swiping calculator function display.

Referring to FIGS. 3A, 3B, 3C, and 3D, results data is displayed in results data display field 319.

In one embodiment, once the results data of PERFORM THE SELECTED MATHEMATICAL OPERATION ON THE SELECTED NUMERICAL DATA ENTRIES OPERATION 209 is displayed on the tablet swiping calculator function display at DISPLAY THE RESULTS OF PERFORMING THE SELECTED MATHEMATICAL OPERATION ON THE SELECTED NUMERICAL DATA ENTRIES ON THE TABLET SWIPING CALCULATOR FUNCTION DISPLAY OPERATION 211, process flow proceeds to EXIT OPERATION 230.

In one embodiment, at EXIT OPERATION 230, Process 200 for providing a tablet swiping calculator function is exited to await new data.

Using process 200 for providing a tablet swiping calculator function discussed above, a user is provided the capability to select a desired mathematical operation and at least two numerical data entries to be operated on by a selected mathematical operation through the tablet swiping calculator function display; all without requiring any significant manual data entry beyond, at most, selecting the mathematical operation and two or more numerical data entries. In addition, when financial transaction entries are involved, the user need only select the financial transaction entries and then numerical data representing the amount of the respective financial transaction entries is automatically obtained. Consequently, process 200 for providing a tablet swiping calculator function makes using a calculator function easier, more efficient, and more user friendly, particularly in a mobile computing environment.

As discussed in more detail above, using the above embodiments, with little or no modification and/or input, there is considerable flexibility, adaptability, and opportunity for customization to meet the specific needs of various parties under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "applying", "analyzing", "associating", "calculating", "capturing", "categorizing", "classifying", "comparing", "creating", "defining", "detecting", "determining", "distributing", "encrypting", "extracting", "filtering", "forwarding", "generating", "identifying", "implementing", "monitoring", "obtaining", "processing", "providing", "receiving", "requesting", "saving", "sending", "storing", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIGS., or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented method for providing a tablet swiping calculator function comprising the following, which when executed individually or collectively by any set of one or more processors perform a process including:
    providing a listing of data in a tablet swiping calculator function display, the listing of data including two or more financial transaction entries automatically and directly imported from an electronic data management system external to and coupled to the tablet swiping calculator function;
    receiving a selection of at least one mathematical operation through the tablet swiping calculator function display using a finger, stylus, or other user touch interface device;
    receiving a selection of at least two of the two or more financial transaction entries through the tablet swiping calculator function display using a finger, stylus, or other user touch interface device;
    performing the selected mathematical operation on the selected financial transaction entries; and
    displaying the results of performing the selected mathematical operation on the selected financial transaction entries on the tablet swiping calculator function display.

2. The computing system implemented method for providing a tablet swiping calculator function of claim 1 wherein the listing of financial transaction entries includes numerical data representing the amount of the respective financial transaction entries.

3. The computing system implemented method for providing a tablet swiping calculator function of claim 2 wherein the listing of financial transaction entries is obtained from a financial management system.

4. The computing system implemented method for providing a tablet swiping calculator function of claim 2 wherein receiving a selection of at least two financial transaction entries through the tablet swiping calculator function display includes providing the capability to select at least two financial transaction entries including the numerical data representing the amount of the respective financial transaction entries.

5. The computing system implemented method for providing a tablet swiping calculator function of claim 4 wherein receiving a selection of at least two financial transaction entries through the tablet swiping calculator function display includes providing the capability to drag and drop the financial transaction entries on the tablet swiping calculator function display using a finger, stylus, or other user touch interface device.

6. The computing system implemented method for providing a tablet swiping calculator function of claim 5 wherein when the financial transaction entries on the tablet swiping calculator function display are dragged and dropped using a finger, stylus, or other user touch interface device, a visual indication of the drag and drop operation and the financial transaction entries involved is displayed on the tablet swiping calculator function display.

7. The computing system implemented method for providing a tablet swiping calculator function of claim 4 wherein receiving a selection of at least two financial transaction entries through the tablet swiping calculator function display includes providing the capability to hold and swipe the financial transaction entries on the tablet swiping calculator function display using a finger, stylus, or other user touch interface device.

8. The computing system implemented method for providing a tablet swiping calculator function of claim 7 wherein when the financial transaction entries on the tablet swiping calculator function display are held and swiped using a finger, stylus, or other user touch interface device, a visual indication of the hold and swipe operation and the financial transaction entries involved is displayed on the tablet swiping calculator function display.

9. The computing system implemented method for providing a tablet swiping calculator function of claim 1 wherein receiving a selection of at least one mathematical operation through the tablet swiping calculator function display includes displaying one or more mathematical operation icons and providing the capability to select one of the mathematical operation icons through the tablet swiping calculator function display.

10. The computing system implemented method for providing a tablet swiping calculator function of claim 1 wherein receiving a selection of at least one mathematical operation through the tablet swiping calculator function display includes providing the capability to draw a defined mathematical operation symbol on the tablet swiping calculator function display using a finger, stylus, or other user touch interface device.

11. The computing system implemented method for providing a tablet swiping calculator function of claim 1 wherein the at least one mathematical operation selectable through the tablet swiping calculator function display includes an addition function.

12. The computing system implemented method for providing a tablet swiping calculator function of claim 1 wherein the at least one mathematical operation selectable through the tablet swiping calculator function display includes at least one mathematical operation selected from the group of mathematical operations consisting of:
   an addition function;
   a subtraction function;
   multiplication function; and
   a division function.

13. The computing system implemented method for providing a tablet swiping calculator function of claim 1 wherein receiving a selection of at least two financial transaction entries through the tablet swiping calculator function display includes providing the capability to drag and drop the at least two financial transaction entries on the tablet swiping calculator function display using a finger, stylus, or other user touch interface device.

14. The computing system implemented method for providing a tablet swiping calculator function of claim 1 wherein when the at least two financial transaction entries on the tablet swiping calculator function display are dragged and dropped using a finger, stylus, or other user touch interface device, a visual indication of the drag and drop operation, and the financial transaction entries involved, is displayed on the tablet swiping calculator function display.

15. The computing system implemented method for providing a tablet swiping calculator function of claim 1 wherein receiving a selection of at least two financial transaction entries through the tablet swiping calculator function display includes providing the capability to hold and swipe at least two financial transaction entries on the tablet swiping calculator function display using a finger, stylus, or other user touch interface device.

16. The computing system implemented method for providing a tablet swiping calculator function of claim 1 wherein when the at least two financial transaction entries on the tablet swiping calculator function display are held and swiped using a finger, stylus, or other user touch interface device, a visual indication of the hold and swipe operation, and the financial transaction entries involved, is displayed on the tablet swiping calculator function display.

17. A system for providing a tablet swiping calculator function comprising:
   at least one processor; and
   at least one memory coupled to the at least one processor, the at least one memory having stored therein instructions which when executed by any set of the one or more processors, perform a process for providing a tablet swiping calculator function, the process for providing a tablet swiping calculator function including:
   providing a listing of data in a tablet swiping calculator function display, the listing of data including two or more financial transaction entries automatically and directly imported from an electronic data management system external to and coupled to the tablet swiping calculator function;
   receiving a selection of at least one mathematical operation through the tablet swiping calculator function display using a finger, stylus, or other user touch interface device;
   receiving a selection of at least two of the two or more financial transaction entries through the tablet swiping calculator function display using a finger, stylus, or other user touch interface device;
   performing the selected mathematical operation on the selected financial transaction entries; and
   displaying the results of performing the selected mathematical operation on the selected financial transaction entries on the tablet swiping calculator function display.

18. The system for providing a tablet swiping calculator function of claim 17 wherein the listing of financial transaction entries includes numerical data representing the amount of the respective financial transaction entries.

19. The system for providing a tablet swiping calculator function of claim 18 wherein the listing of financial transaction entries is obtained from a financial management system.

20. The system for providing a tablet swiping calculator function of claim 18 wherein receiving a selection of at least two financial transaction entries through the tablet swiping calculator function display includes providing the capability to select at least two financial transaction entries including the numerical data representing the amount of the respective financial transaction entries.

21. The system for providing a tablet swiping calculator function of claim 20 wherein receiving a selection of at least two financial transaction entries through the tablet swiping calculator function display includes providing the capability to drag and drop the financial transaction entries on the tablet swiping calculator function display using a finger, stylus, or other user touch interface device.

22. The system for providing a tablet swiping calculator function of claim 21 wherein when the financial transaction entries on the tablet swiping calculator function display are dragged and dropped using a finger, stylus, or other user touch interface device, a visual indication of the drag and drop operation and the financial transaction entries involved is displayed on the tablet swiping calculator function display.

23. The system for providing a tablet swiping calculator function of claim 20 wherein receiving a selection of at least two financial transaction entries through the tablet swiping calculator function display includes providing the capability to hold and swipe the financial transaction entries on the tablet swiping calculator function display using a finger, stylus, or other user touch interface device.

24. The system for providing a tablet swiping calculator function of claim 23 wherein when the financial transaction entries on the tablet swiping calculator function display are held and swiped using a finger, stylus, or other user touch interface device, a visual indication of the hold and swipe operation and the financial transaction entries involved is displayed on the tablet swiping calculator function display.

25. The system for providing a tablet swiping calculator function of claim 17 wherein receiving a selection of at least one mathematical operation through the tablet swiping calculator function display includes displaying one or more mathematical operation icons and providing the capability to select one of the mathematical operation icons through the tablet swiping calculator function display.

26. The system for providing a tablet swiping calculator function of claim 17 wherein receiving a selection of at least one mathematical operation through the tablet swiping calculator function display includes providing the capability to draw a defined mathematical operation symbol on the tablet swiping calculator function display using a finger, stylus, or other user touch interface device.

27. The system for providing a tablet swiping calculator function of claim 17 wherein the at least one mathematical operation selectable through the tablet swiping calculator function display includes an addition function.

28. The system for providing a tablet swiping calculator function of claim 17 wherein the at least one mathematical operation selectable through the tablet swiping calculator function display includes at least one mathematical operation selected from the group of mathematical operations consisting of:
   an addition function;
   a subtraction function;
   a multiplication function; and
   a division function.

29. The system for providing a tablet swiping calculator function of claim 17 wherein receiving a selection of at least two financial transaction entries through the tablet swiping calculator function display includes providing the capability to drag and drop the at least two financial transaction entries on the tablet swiping calculator function display using a finger, stylus, or other user touch interface device.

30. The system for providing a tablet swiping calculator function of claim 17 wherein when the at least two financial transaction entries on the tablet swiping calculator function display are dragged and dropped using a finger, stylus, or other user touch interface device, a visual indication of the drag and drop operation, and the financial transaction entries involved, is displayed on the tablet swiping calculator function display.

31. The system for providing a tablet swiping calculator function of claim 17 wherein receiving a selection of at least two financial transaction entries through the tablet swiping calculator function display includes providing the capability to hold and swipe at least two financial transaction entries on the tablet swiping calculator function display using a finger, stylus, or other user touch interface device.

32. The system for providing a tablet swiping calculator function of claim 17 wherein when the at least two financial transaction entries on the tablet swiping calculator function display are held and swiped using a finger, stylus, or other user touch interface device, a visual indication of the hold and swipe operation, and the financial transaction entries involved, is displayed on the tablet swiping calculator function display.

33. A system for providing a tablet swiping calculator function comprising:
   at least one processor; and
   at least one memory coupled to the at least one processor, the at least one memory having stored therein instructions which when executed by any set of the one or more processors, perform a process for providing a tablet swiping calculator function, the process for providing a tablet swiping calculator function including:
   providing a listing of financial transaction entries automatically imported directly from a financial management system external to and coupled to the tablet swiping calculator function, each of the financial transaction entries including numerical data indicating an amount associated with the financial transaction entry and data indicating a financial category assigned to the financial transaction entry;
   receiving a selection of at least one mathematical operation through a tablet swiping calculator function display using a finger, stylus, or other user touch interface device;
   receiving a selection of at least two of the two of the financial transaction entries through the tablet swiping calculator function display using a finger, stylus, or other user touch interface device;
   performing the selected mathematical operation on the selected financial transaction entries; and
   displaying the results of performing the selected mathematical operation on the selected financial transaction entries on the tablet swiping calculator function display.

34. The system for providing a tablet swiping calculator function of claim 33 wherein receiving a selection of at least two of the financial transaction entries through the tablet swiping calculator function display includes receiving a selection of a financial category; and
performing the selected mathematical operation on the financial transaction entries associated with the selected financial category.

\* \* \* \* \*